(12) United States Patent
Ma et al.

(10) Patent No.: US 11,270,579 B2
(45) Date of Patent: Mar. 8, 2022

(54) TRANSPORTATION NETWORK SPEED FOREEASTING METHOD USING DEEP CAPSULE NETWORKS WITH NESTED LSTM MODELS

(71) Applicant: BEIHANG UNIVERSITY, Beijing (CN)

(72) Inventors: Xiaolei Ma, Beijing (CN); Yunpeng Wang, Beijing (CN); Sen Luan, Beijing (CN); Dai Zhuang, Beijing (CN); Yi Li, Beijing (CN)

( * ) Notice: Subject to any disclaimer, the term of this patent is extended or adjusted under 35 U.S.C. 154(b) by 480 days.

(21) Appl. No.: 16/385,302

(22) Filed: Apr. 16, 2019

(65) Prior Publication Data

US 2020/0135017 A1 Apr. 30, 2020

(51) Int. Cl.
| | | |
|---|---|---|
| G06G 7/70 | (2006.01) | |
| G08G 1/052 | (2006.01) | |
| G06N 20/00 | (2019.01) | |
| G06N 5/04 | (2006.01) | |
| G08G 1/01 | (2006.01) | |

(52) U.S. Cl.
CPC .............. G08G 1/052 (2013.01); G06N 5/046 (2013.01); G06N 20/00 (2019.01); G08G 1/0129 (2013.01)

(58) Field of Classification Search
CPC ...... G08G 1/052; G08G 1/0129; G06N 20/00; G06N 5/046
See application file for complete search history.

(56) References Cited

U.S. PATENT DOCUMENTS

2020/0135017 A1* 4/2020 Ma ...................... G06N 3/0445

\* cited by examiner

*Primary Examiner* — Adam M Alharbi

(57) ABSTRACT

This application is a transportation network speed forecasting method using deep capsule networks with nested LSTM models. The method includes the following steps: (1) This method divides the transport network into road links, calculates average speeds of each road link, maps the average speeds into a grid system, and generate traffic images representing traffic state at time intervals; (2) the method uses a CapsNet to capture the spatial relationship between road links. The learn patterns are represented in vectors; (3) The vectors of CapsNet are feed into a NLSTM model to learn temporal relationships between road links; (4) The model is trained using and training dataset, and predicts future traffic states using testing dataset. This application uses a new and advanced CapsNet neural structure, while can more efficiently deal with complex traffic networks than CNN models.

6 Claims, 2 Drawing Sheets

TRANSPORTATION NETWORK SPEED FOREEASTING METHOD USING DEEP CAPSULE NETWORKS WITH NESTED LSTM MODELS

TECHNICAL FIELD

This application is related to transport information prediction. This is a transportation network speed forecasting method using deep capsule networks with nested LSTM models.

BACKGROUND

Transport prediction is an important transportation research topic. It predicts future traffic congestions using history traffic data. Transport prediction becomes one of the most powerful tools in transportation to solve traffic congestions by not only providing commuters with better routing scheme, but also developing key management insights for traffic planners. With the prevalent installation of intelligent transportation systems (ITS) and global position systems (GPS) on buses, the costs to collecting data are largely reduced compared with the traditional data collection methods, such as surveys and loop detectors. The vast data makes transport predictions at large scales become feasible, so as to the macro traffic controls by analyzing these traffic congestion data.

Road traffic is inherently dynamic, complex and unstable due to the complexity of transport networks, such as the coexistence of main stream, road intersections, quick ways, et. Moreover, the data quality of the captured data by ITS systems varies greatly, despite the data size is huge. The collected data is usually highly unstructured, heterogeneous in quality, dynamic in time and space. These characteristics make great challenges for conventional machine learning methods to extract valuable information from it. To address the problems, recent years show a trend of gradually employing deep learning models to analyze traffic data. Deep learning models show greater learning and generalization abilities than conventional machine leaning methods by adopting deep and well-tuned model structures. Deep learning models can make much more accurate predictions on network level by mining time-space evolution patterns of traffic from the collected big data.

However, deep learning models for traffic prediction have some limitations to date: (1) For deep learning models that construct time series for each road segment and make predictions by mining their time evolution, patterns using recursive artificial networks, the prediction accuracy is low because these models only consider value correlations across time for separate road segments. Traffic correlations across space are not considered in these models; (2) For convolutional deep learning models that represent traffic as images and learn time-space traffic relation through multiple convolution and pooling layers, the prediction accuracy is extremely unstable and dependent on the placing order of road segments on one dimension of the time-space image: (3) For other deep learning models that introduce coordinate systems into traffic networks, they see traffic evolutions across time as frames of videos and apply convolution and recurrent networks to mine the time-space patterns of traffic. These deep learning models ignore the graphic structure of traffic networks and treat overlapping road segments (such as bridge and roads under it) as one, so they cannot efficiently capture traffic flows on complex traffic networks with overlapping road structure. Moreover, the square size of coordinate systems also has great influence on the prediction accuracy of these models.

The Application

A transportation network forecasting method using deep capsule networks (CapsNet) with nested LSTM models (NLSTM) is proposed in this application address the limitations of current practice, and to efficiently mine the time-space pattern of traffic in complex traffic networks. Specifically, the model uses CapsNet to extract the spatial features of traffic networks and utilizes NLSTM to capture the hierarchical temporal dependencies in traffic sequence data. The CapsNet and NLSTM are, sequentially connected into the final model.

DESCRIPTION

The model realizes its prediction power by using following steps.

1) Data Preprocessing.

First, setting up speed profile for each road segment based on three steps. The first step divides the traffic network into n road links. The second step discretizes the investigated time into intervals. The time interval should not be too long nor too short, in order to capture the traffic evolution pattern in short time periods. The natural choice of time interval can be around 2-4 minutes. The third step calculates average travel speed of each link at each time interval. The average travel speed $V_{at}$ for link $a \in (1, 2, \ldots, n)$ at time t is given by $$V_{at} = \frac{\sum_{j=1}^{k} V_{it}}{k}$$

where k is the number of cars that travel through the road link at this time interval. $V_{it}$ represents the average travel speed for car i.

Then, establishing the mapping relationship between the average speed and road link in GIS maps.

Finally, the geographical area of the road network is meshed into squares or coordinates. A value representing the average speed is assigned to each square. The average speed for each square is calculated as follows. For squares with no road links, the average speed is zero. The squares with at least one links, the value is the average speed of these links. Representing these average speeds as pixels of images, images representing the traffic state of the network in all time intervals can be obtained. These images are inputs of the proposed model. The model outputs are vectors containing average speeds for all road links at the next time interval. Let (X, Y) represents the model inputs and outputs.

2) Constructing CapsNet to Extract Spatial Features of Traffic Networks.

CapsNet first extracts variety of local features of traffic speed through a primary layer. The local features are then integrated into high-level features (i.e., represented by vectors) by final layers. The integrated features contain information not only about local time-space patterns between road links, but also about the high-level correlation between these local features. Thus, the integrated feature represents traffic patterns of the whole network, while encapsulating local pattern into high-level representations.

3) Constructing NLSTM to Capture the Hierarchical Temporal Dependencies in Traffic Sequence Data.

The inputs of the NLSTM are the output vectors of CapsNet. NLSTM transforms the traditional two-layer LSTM structure into two LSTM structures connected by a gate unit. NLSTM treats the input vectors as time-series in training.

4) Connecting CapsNet and NLSTM to Predict Traffic Speeds at Network Level.

The output vectors that, represent traffic patterns of the transport network from the CapsNet model are feed into the NLSTM model as time-series to learn temporal patterns across these abstract features NLSTM makes predictions on future traffic states (i.e., traffic speeds) by a fully-connected layer. In summary, the model makes prediction on future traffic states by learning the history traffic patterns represented as images (in step 1).

This application has the following advantages.

This application solves the problem that the spatial structure of road links in complex traffic networks cannot be handled efficiently by traditional statistical models and machine learning models. This application represents traffic states over time as images, and utilizes a CapsNet model and a NLSTM model to learn spatial and temporal traffic patterns, respectively. The model proposed has much higher prediction accuracy compared with traditional methods.

This application uses a more advanced deep learning structure called CapsNet. The CapsNet model is more powerful in handling overlapping road structures and low data resolution situations than CNN models. CapsNet uses vectors neurons instead of scalar neurons, so that more comprehensive time-space features of traffic can be preserved such as link location, length, direction and traffic speeds.

This application alters the sequential layer structure of LSTM as internal and external structures and connects them with, a gate unit, so that information can be passed between internal and external memory units without a second-screen process of sequential structure. This character makes the model more stable and efficient when dealing with long term history information.

Compared with traditional methods, this application makes predictions not only by mining tune-space patterns of traffic, but also by targeting and analyzing complex road structures, such as overlapping between roads and bridges. This application fills the gap that little practical methods are proposed to handle traffic prediction for complex road structures. The tests show that the model is accuracy and robust.

IMPLEMENTATION STEPS

This application is a transportation network speed forecasting method using deep capsule networks with nested LSTM models. The implementation steps are as follows.

1. Data Preprocessing and Training Dataset Generation

Figure 1:
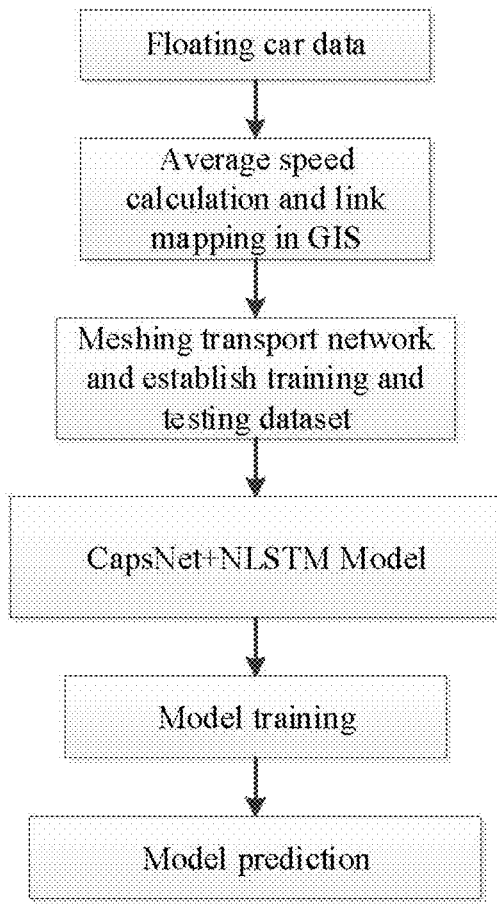
FIG. 1 shows the research flow chart.
Figure 2:
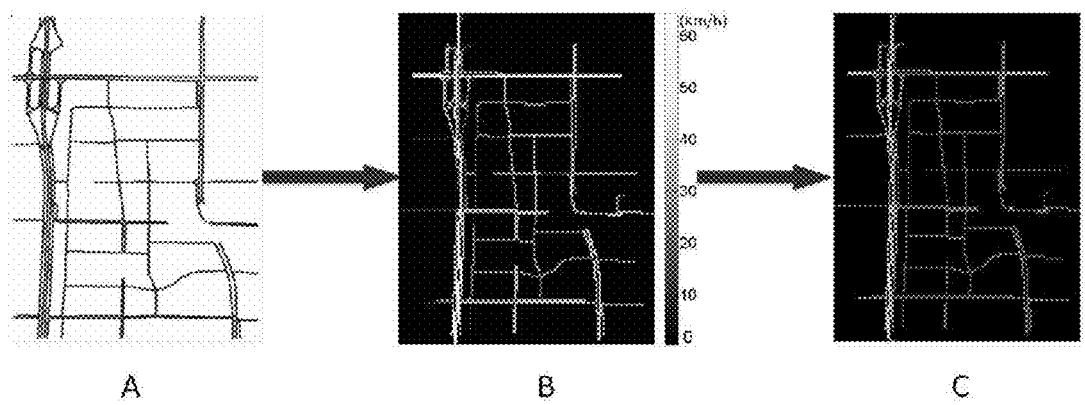
FIG. 2 shows the mapping process of traffic speeds and road links.
Figure 3:
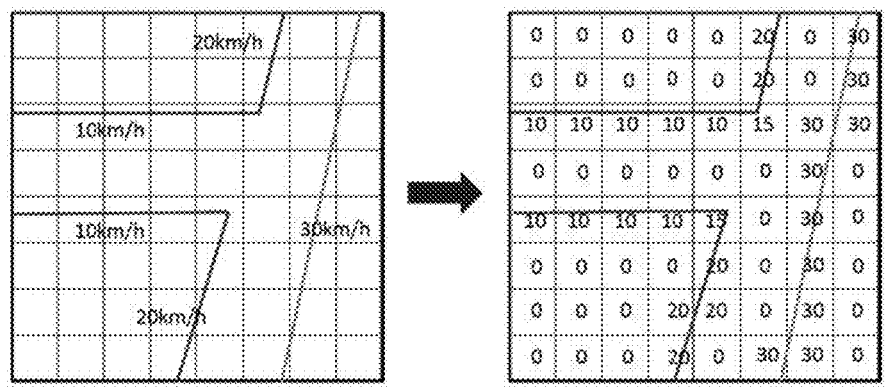
FIG. 3 shows underlying grid system of transport networks.

The selected network (FIG. 2A) is a transport network in Beijing. The network has an area of 2.42 square kilometers (1.64 km*1.48 km), and contains 278 road links geographically closing to each other. The average speed for road links is calculated based on a 2 minutes time interval. The average speed is set to the free flow speed when no cars pass through the link. The average speeds are mapped to links in the transport network as shown in FIG. 2B.

The road network is segmented by grids with a size of 0.0001°×0.0001° (latitude and longitude). The value of each grid is determined on the basis of the speed of links using the following criteria: if no link passes through the grid area, then the value is zero; if only one link passes through the grid area, the value is the speed of this link; if multiple links pass through the same grid area, the value is the average speed of, all links.

On the basis of the above process, each grid is taken as a pixel with one channel, in which its value is the projected velocity value. Sequences of images are generated as data samples, and the time interval in, these sequences is 2 minutes. These images not only represent the traffic state but also contain the spatial structure of the road network and the relative topology among different links.

The model input is a two-dimensional vector containing traffic state in the last 15 time intervals (i.e., 30 minutes). The model output is a vector containing traffic states of all road link in the following 3 time intervals (i.e., 6 minutes). One training sample of the model is represented as $s=[(x_1, x_2, \ldots x_{15}), (y_1, y_2, y_3)]$, where $\{x_i\}_{i=1}^{15}$ represents traffic states observed in the last 15 time intervals and $(y_1, y_2, y_3)$ represent traffic states, in the 3 future time intervals. The implementation uses data from Jun. 1, 2015 to Jun. 30, 2015 as training set, and uses data from Aug. 1, 2015 to Aug. 14, 2015 as test set. Traffic data between 6:00 AM and 10:00 PM is used, so there are 481 samples every day.

2. Constructing CapsNet to Extract Spatial Features of Traffic Networks.

CapsNet is a new type of NN structure. It replaces scalar neurons in the CNN with vector neurons, so that much more comprehensive traffic information can be kept, such as rotation angle, direction, and size of local features. In addition, CapsNet can retain all the extracted local features by replacing the pooling operation with a dynamic routing operation between capsule layers. Thus, CapsNet has greater learning ability than CNN because it keeps spatial relationships among road links.

Figure 4:
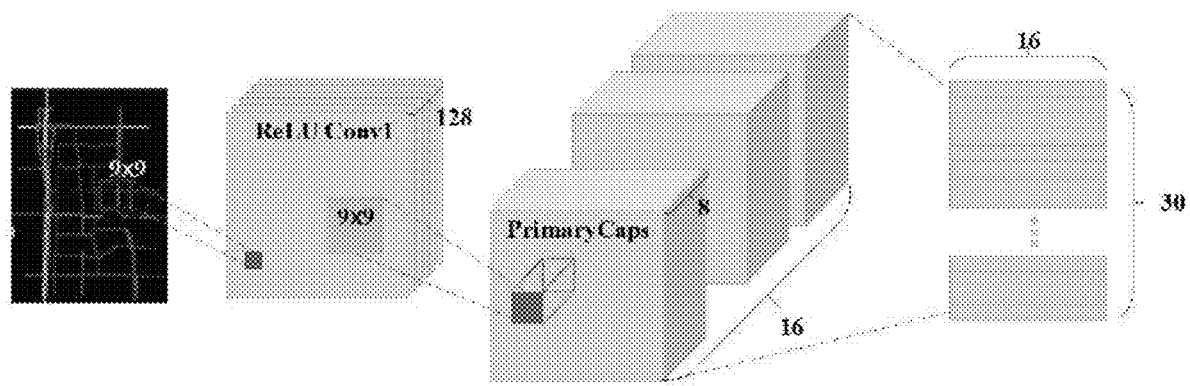
FIG. 4 shows the structure of CapsNet.

CapsNet is composed of primary capsule layers (PrimaryCaps) and fully connected layers (TrafficCaps). The implementation of CapsNet is shown in FIG. 4. The model contains two convolution layers and one fully connected layer. The input image representing historical traffic states is first feed into the first convolution layer to learn local features between road links. Then, the PrimaryCaps layer further learns abstract features upon the local features. These abstract features will obtain traffic patterns between links far away from each other. These abstract features also come as vectors other than scalars. Finally, a TrafficCaps layer is used to combines all features and transforms them into predictions. The PrimaryCaps layer in this implementation uses a new non-linear activation function called squashing, which is given by $$v_j = \frac{\|s_j\|^2}{1+\|s_j\|^2} \frac{s_j}{\|s_j\|} \tag{1}$$

where $v_j$ is the output vector, and $s_j$ is the input vector. The squashing operation ensures that the short vectors shrink to approximately zero length and long vectors shrink to a length slightly below 1. Thus, the length of the output vector of a capsule can represent the probability of the existence of the extracted local features.

In the convolution layers, the value of neurons is the activated as the weighted sum of neurons in the leading layer. The network is solved using back propagation. The structure of the CapsNet is discussed as follows.

First, to obtain the spatial relationship between the local features of network-level traffic state extracted by the primary layer and advanced features, an affine transformation is performed by multiplying the local features with a weight matrix $W_{ij}$.

$$\hat{u}_{j|i} = W_{ij} u_i, \quad (2)$$

where $u_i$ is the local features extracted by a primary capsule i, and $\hat{u}_{j|i}$ is the input vector associated with an advanced capsule j.

Then, input $s_j$ to an advanced capsule j is the weighted sum over all input vectors $\hat{u}_{j|i}$ from the primary capsule layer.

$$s_j = \Sigma_i c_{ij} \hat{u}_{j|i} \quad (3)$$

where weights $c_{ij}$ are the coupling coefficients that determined by an iterative dynamic routing algorithm. The essence of the dynamic routing algorithm is to find a part of primary capsules that is highly correlated to the advanced capsules, that is, to determine the local features with high probability to be associated with the high-level feature. This process represents the capability of the model to explore the spatial relationships among the distant links. The dynamic routing algorithm is described as follows.

1). For each primary capsule i in the primary capsule layer, the coupling coefficients $c_{ij}$ with all the advanced capsules j are summed to 1 by using a SoftMax function:

$$c_{ij} = \frac{\exp(b_{ij})}{\sum_k \exp(b_{ik})} \quad (4)$$

where routing logit $b_{ij}$ is the log prior probability that capsule i should be coupled to capsule j, and output $c_{ij}$ represents the normalized probability that primary capsule i is associated with advanced capsule j. In the first iteration, the initial value of routing logit $b_{ij}$ is set to zero in which the probabilities of the primary capsule accepted by each advanced capsule are equal.

2) After all the weights $c_{ij}$ are calculated for all the primary capsules, each advanced capsule j is weighted by using Equation (3).

3) The input vector to advanced capsule layer is activated by a squashing function. The output is $v_j$.

4) Updating $b_{ij}$ on the basis of the following rule:

$$b_{ij} = b_{ij} + \hat{u}_{j|i} v_j.$$

Routing logit $b_{ij}$ is updated by using the dot product of the input to capsule j and its output. In the field of mathematics, the dot product becomes large for similar vectors. Therefore, the corresponding routing logit increases when the input and output are similar; thus, the primary capsule is coupled to the advanced capsule with a similar output. This process represents the association of local features with the high-level feature.

5) Repeating Steps 1-4 to obtain the optimal routing weights. The dynamic routing algorithm is easy to be optimized, and experiments show that the CapsNet model can be optimized by iterating three times on the training dataset.

3. Capture Temporal Relationship Between Traffic States Using LSTM

Figure 5:
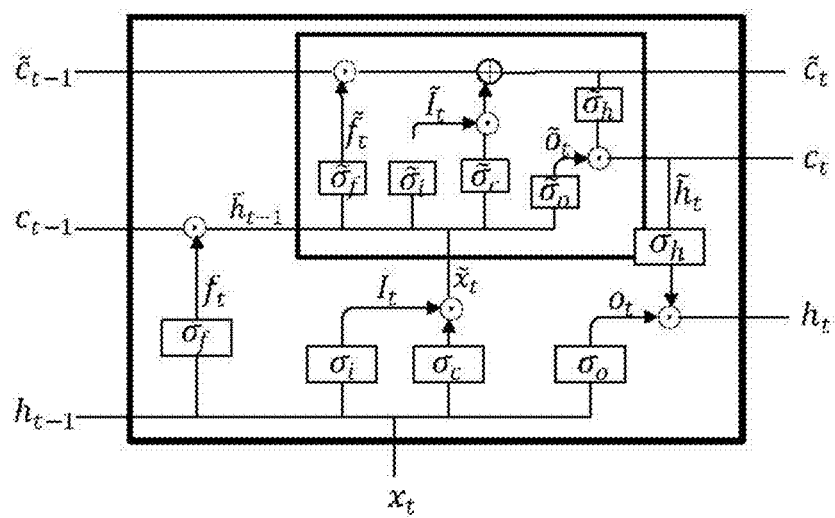
FIG. 5 shows the structure of NLSTM.

FIG. 5 shows the structure of NLSTM used in this application. The NLSTM contains an internal LSTM unit and an external LSTM unit. The model input, is the learned abstract traffic patterns of the 30 minutes history traffic states, and the model output is the predicted traffic state in the near future (i.e., 6 minutes). Following equations model the two LSTM units.

$$\tilde{I}_t = \tilde{\sigma}_i(\tilde{x}_t \tilde{W}_{xi} + \tilde{h}_{t-1} \tilde{W}_{hi} + \tilde{b}_i)$$

$$\tilde{f}_t = \tilde{\sigma}_f(\tilde{x}_t \tilde{W}_{xf} + \tilde{h}_{t-1} \tilde{W}_{hf} + \tilde{b}_f)$$

$$\tilde{c}_t = \tilde{f}_t \odot \tilde{c}_{t-1} + \tilde{I}_t \odot \tilde{\sigma}_c(\tilde{x}_t \tilde{W}_{xc} + \tilde{h}_{t-1} \tilde{W}_{hc} + \tilde{b}_c)$$

$$\tilde{o}_t = \tilde{\sigma}_o(\tilde{x}_t \tilde{W}_{xo} + \tilde{h}_{t-1} \tilde{W}_{ho} + \tilde{b}_o)$$

$$\tilde{h}_t = \tilde{o}_t \odot \tilde{\sigma}_h(\tilde{c}_t)$$

where $\tilde{x}_t$, $\tilde{h}_{t-1}$ are the inputs of the internal LSTM unit. They can be calculated as $$\tilde{x}_t = I_t \odot \sigma_c(x_t W_{xc} + h_{t-1} W_{hc} + b_c)$$

$$\tilde{h}_{t-1} = f_t \odot c_{t-1}$$

where $\tilde{I}_t$, $\tilde{f}_t$, and $\tilde{o}_t$ are the three states of the gates; $\tilde{c}_t$ is the cell input state; $\tilde{W}_{xi}$, $\tilde{W}_{xf}$, $\tilde{W}_{xo}$, and $\tilde{W}_{xc}$ are the weight matrices that connect $\tilde{x}_t$ to the three gates and cell input; $\tilde{W}_{hi}$, $\tilde{W}_{hf}$, $\tilde{W}_{ho}$, and $\tilde{W}_{hc}$ are the weight matrices that connect $\tilde{h}_{t-1}$ to the three gates and cell input; $\tilde{b}_i$, $\tilde{b}_f$, $\tilde{b}_o$, and $\tilde{b}_c$ are the biases of the three gates and cell input; σ represents the sigmoid function; and ⊙ represents the scalar product of two vectors.

For the external LSTM unit, only the cell state update rule is changed to the output of the internal LSTM, i.e., $c_t = \tilde{h}_t$.

4. Combine Models to Predict Future Traffic State

The final model connects the CapsNet model and NLSTM model sequentially, and puts a fully connected layer at last. The structure of the final model is, as follows.

TABLE 1

Model structure of CapsNet + NLSTM

| Name of layers | Parameters | Output | Parameter scale |
|---|---|---|---|
| Input | | 164 × 148 × 1 | 0 |
| Convolution | Kernel size = 9 × 9 | | |
| | Channels = 128 | 78 × 70 × 128 | 10,496 |
| | Stride = 2 | | |
| PrimaryCaps | Kernel size = 9 × 9 | 18 × 16 × 128 | 1,327,232 |
| (Convolution) | Channels = 128 | | |
| | Stride = 4 | | |
| Reshape | Capsule dimension = 8 | 4,608 × 8 | 0 |
| TrafficCaps | Advanced capsule = 30 | 30 × 16 | 17,694,720 |
| (Fully connected) | Capsule dimension = 16 | | |
| (Flattened) | | 480 | 0 |
| NLSTM | Hidden unit = 800 | 800 | 9,222,400 |
| Dropout | 0.2 | 800 | 0 |
| Fully connected | | 278 | 222,678 |
| Total parameters | | | 28,477,526 |

The deep learning model is implemented based on Keras framework and is trained on a server with 8 NVIDIA GeForce Titan X GPUs (12 GB RAM).

5. Evaluation Metrics and Model Comparison

Feeding the testing dataset into the trained model, traffic states at future six minutes can be predicted using historical 30 minutes data. The MSE and MAPE are calculated as follows.

$$MSE = \frac{1}{n}\sum_{i=1}^{N}(\hat{y}_i - y_i)^2$$

$$MAPE = \frac{1}{n}\sum_{i=1}^{N}\left(\frac{\hat{y}_i - y_i}{\hat{y}_i}\right)$$

Where $\hat{y}_i$ is the predicted value, while $y_i$ is the true value. The prediction accuracy is demonstrated as follows.

TABLE 3

Comparison among different methods

| Metrics | Time steps | | | | | |
| --- | --- | --- | --- | --- | --- | --- |
| | 2 min | | 4 min | | 6 min | |
| | MSE | MAPE | MSE | MAPE | MSE | MAPE |
| LSTMs | 41.67 | 0.2158 | 44.67 | 0.2255 | 48.11 | 0.2273 |
| NLSTM | 39.55 | 0.2067 | 44.49 | 0.2229 | 47.32 | 0.2246 |
| DCNNs | 42.94 | 0.2131 | 47.14 | 0.2367 | 51.38 | 0.2384 |
| CapsNet | 35.80 | 0.1891 | 42.53 | 0.2205 | 47.08 | 0.2308 |
| CNN + LSTMs | 36.57 | 0.2051 | 43.10 | 0.2181 | 45.90 | 0.2258 |
| CapsNet + NLSTM | 31.04 | 0.1757 | 39.29 | 0.2071 | 42.88 | 0.2183 |

The results show that the proposed model generate lowest MSEs and MAPEs under all circumstances, suggesting that the proposed model, can mine traffic patterns efficiently and is accurate and stable in traffic state prediction.

The invention claimed is:

1. A road network status prediction method based on a capsule network and a nested long-short term memory neural network, comprising the following specific steps:

Step 1. selecting a target road network, dividing same into n road sections, and dividing time at equal interval;

Step 2. for a certain time interval t, calculating the average velocity of all vehicles passing through each road section within the time interval t;

if no vehicle passes through a certain road section a within the time interval t, replacing the average velocity with the average velocity within the previous time interval;

wherein the average velocity of the road section a within the time interval t is calculated as follows:

$$V_{at} = \frac{\sum_{i=1}^{k} V_{it}}{k}$$

where $V_{at}$ represents the average velocity of the road section a within the time interval t, $a \in (1, 2, \ldots, n)$; k represents the number of vehicles passing through the road section within the time interval, and $V_{it}$ represents the average velocity of each vehicle passing through the road section;

Step 3. in combination with a GIS map, projecting the average velocity of each road section within each time interval into the road network, and establishing a spatial corresponding relationship between each road section and the average velocity;

Step 4. performing mesh division on a spatial geographic area where the target road network is located according to the latitude and longitude range, and evaluating each mesh according to the average velocity of the road section;

Step 5. taking the value corresponding to each mesh within each time interval as a pixel, generating pictures corresponding to all time intervals, and taking all pictures obtained within the study time range as an input sample set of a prediction model;

wherein each picture represents the traffic status of the road network within each time interval;

the prediction model is (X, Y), and is represented by a status vector composed of velocities of each road section; X represents the input training and test sample set pictures, and Y represents output, is a true value of the predicted road network status, and is in the form of a status vector;

Step 6. constructing, a capsule network model, and extracting spatial features of the input sample set;

Step 7. replacing a memory unit in the LSTM structure with a complete LSTM structure and connecting same by a gate unit, and building a nested long-short term memory neural network model to extract time sequence evolution features of the traffic status of the road network;

Step 8. performing sequential connection on the capsule network model and the nested long-short term memory neural network model, to constitute a final combined prediction model;

Step 9. repeatedly training, and verifying the combined prediction model using the input sample training set, to obtain the most accurate prediction model composed of optimal model parameters; and making accurate prediction using test set pictures within previous several time periods as input, to obtain the status of the road network within a certain time period in the future, wherein the status of the road network within a certain time period in the future is represented by a status vector composed of velocities of vehicles passing through each road section.

2. A road network status prediction method based on a capsule network and a nested long-short term memory neural network of claim 1, wherein in the step 1, the time interval is divided by taking the rule of capturing the change of the traffic status of the road network as much as possible within a short time as a principle.

3. A road network status, prediction method based on a capsule network and a nested long-short term memory neural network of claim 1, wherein in the step 3, the spatial corresponding relationship means that the average velocity value of each road section is matched to the line segment in the spatial geographic area corresponding thereto, and velocities are represented by different gray scales.

4. A road network status prediction method based on a capsule network and a nested long-short term memory neural network of claim 1, wherein in the step 4, the value standards are as follows:

for a mesh area without a road section, the value is zero;

for a mesh area with only one road section, the value is the corresponding average velocity of the road section; and for a mesh area with more than two road, sections, the value is the mean of corresponding average velocities of all road sections.

5. A road network status prediction method based on a capsule network and a nested long-short term memory neural network of claim 1, wherein the step 6 specifically includes the following steps:

first, establishing a primary-level capsule layer according to the input sample set pictures, and extracting a plurality groups of spatial local features of the traffic status, of the road network implied in the pictures as low-level capsules; then, establishing a high-level capsule layer, integrating the local features in all the low-level capsules in a mode of full connection, further extracting a spatial relationship among all the local features to obtain a group of high-level capsules which characterize the global spatial relationship among the traffic status of the road network, and converting the group of high-level capsules into a group of spatial feature vectors to make preparation for subsequent model establishment.

6. A road network status prediction method based on a capsule network and a nested long-short term memory neural network of claim 1, wherein in the step 8, the sequential connection means that the spatial feature vector of each time interval output by the capsule network model is used as the input of the nested long-short term memory neural network model, a full connection layer is added at the end of the nested long-short term memory neural network model, building a complete deep learning framework, and combining a prediction model.

* * * * *